US007176588B2

(12) United States Patent
Yahagi et al.

(10) Patent No.: US 7,176,588 B2
(45) Date of Patent: Feb. 13, 2007

(54) STARTER DRIVE DEVICE

(75) Inventors: Takuya Yahagi, Shioya-gun (JP); Takashi Hisaki, Wako (JP); Shuji Tomimatsu, Wako (JP); Satoshi Arai, Wako (JP); Shigeki Baba, Utsunomiya (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/221,785

(22) Filed: Sep. 9, 2005

(65) Prior Publication Data

US 2006/0082316 A1 Apr. 20, 2006

(30) Foreign Application Priority Data

Sep. 14, 2004 (JP) ............................ 2004-266646

(51) Int. Cl.
*B60R 22/00* (2006.01)
*B60K 28/12* (2006.01)

(52) U.S. Cl. .................. 307/10.6; 307/10.3; 307/10.1; 180/283; 180/279

(58) Field of Classification Search .................... None
See application file for complete search history.

(56) References Cited

U.S. PATENT DOCUMENTS

| | | | | |
|---|---|---|---|---|
| 7,105,944 | B2 * | 9/2006 | Wakitani et al. | 307/10.6 |
| 2002/0185098 | A1 * | 12/2002 | Perry et al. | 123/179.3 |

* cited by examiner

*Primary Examiner*—Tuyet Thi Vo
(74) *Attorney, Agent, or Firm*—Squire, Sanders & Dempsey L.L.P.

(57) ABSTRACT

A starter drive device which drives a starter motor by, upon actuation of a starter switch, turning a starter relay ON and OFF via an electronic control device, wherein the electronic control device includes: an interface circuit; a power source control circuit; a calculation device and a delay circuit; a buffer; an addition circuit; a latch circuit; a first pull up circuit; a second pull up circuit; and wherein, if the power source control circuit has detected a drop of voltage of the power source when the starter motor is being driven, along with stopping the calculation device, the buffer disconnects the calculation device from the latch circuit, and controls the starter relay by operating the driver circuit via the latch circuit based upon the signals from the interface circuit and the second pull up circuit.

3 Claims, 3 Drawing Sheets

STARTER DRIVE DEVICE

BACKGROUND OF THE INVENTION

1. Field of the Invention

The present invention relates to a wiring pattern formation method, a manufacturing method for a multi layer wiring substrate, and an electronic device.

Priority is claimed on Japanese Patent Application No. 2004-266646, filed Sep. 14, 2004, the content of which is incorporated herein by reference.

2. Description of Related Art

A starter drive device which drives the starter motor of a vehicle has been, per se, known from the past. Such a starter drive device is an apparatus which supplies electric power to the vehicle starter motor upon the driver actuating a starter switch and turning a starter relay ON. With such a starter drive device, there has been the problem that the starter may be driven uselessly, if the driver of the vehicle continues to actuate the starter switch irregardless of the fact that the starting of the engine has been completed. Furthermore, there has also been the problematical feature that, irrespective of whether the engine has been started, if the driver of the vehicle actuates the starter switch, the starter motor can be driven, so that there is a possibility of a strange sound being generated from the engine, and of possible damage to various components of the starting mechanism.

In this connection, in order to cope with this problem, it has been practiced to provide an electronic control device (ECU) which controls the turning ON and OFF of the starter relay, and which turns the starter relay OFF automatically when the starting of the engine has been completed, and thereafter prohibits the starter relay from being turned ON again during operation of the engine. However, it is necessary to supply a large starting electrical current to the starter motor for starting the engine. Thus, with a starter drive device which employs the above described type of electronic control device, when the power source voltage drops in this manner while driving the starter motor, there is a possibility that the power source voltage which is being supplied to the electronic control device may drop below the necessary minimum voltage for operating its calculation device (CPU), which entails a reset of the calculation device. In this case the driving by the starter motor stops, and as a result there is a possibility that a situation may be arrived at in which it is not possible to start the engine.

Thus, in order to avoid this type of situation, it has been proposed (refer to, for example, Japanese Unexamined Patent Application, First Publication 2003-293916) to provide a normally closed relay which is usually in the state of providing an electrical connection between the starter switch and the starter motor, when no drive electrical current is being provided to the starter relay, while it is in the state of disconnecting the starter switch from the starter motor when a drive electrical current is being provided from the electronic control device to the starter drive relay. With such a starter drive device, if the power source voltage for the electronic control device drops below the operating voltage for its calculation device, since the starter switch and the starter motor are kept in the connected state due to the operation of the normally closed relay even though no current is being provided to the starter relay, it is possible to maintain the supply of operating electrical power to the starter motor, and thus to start the engine.

Furthermore, there has been proposed a starter drive device (refer to, for example, Japanese Unexamined Patent Application, First Publication 2001-132596) in which drive prohibition control of the starter motor is performed, irrespective of whether the starter switch is ON or OFF. Such a starter drive-device is a device which includes a first transistor which changes over between drive permission and drive prohibition for the starter relay, based upon a starter drive permit signal which is outputted from the calculation device, and a second transistor which monitors the state of the calculation device, and which changes over the first transistor between ON and OFF, based upon the state of a pulse type reset signal which is outputted when the calculation device is reset.

However since, with the former above described starter drive device, two power supply systems are required to be connected from a single battery of the vehicle, the cost of the wiring harness and the relays and so on is elevated, as compared with a system in which only one such power supply system is fitted. Furthermore there is a problem in that, even if the power source voltage recovers and reaches the operating voltage of the calculation device, since the calculation device performs its initialization procedure directly after this voltage recovery, the output signal of the calculation device goes to logically indeterminate (high impedance) at this time, and as a result the operation of the starter relay and the normally closed relay becomes unstable.

Moreover, with the latter above described starter drive device, while the reset signal from the calculation device continues during a drop of the power source voltage, the first transistor is switched over so as to prohibit driving of the starter relay, and thereafter, after the input of the reset signal has ceased for a predetermined time period, the first transistor is again switched over so that the starter relay is driven. Due to this, it takes a comparatively long time until the starter relay is driven, and thereby the startability of the engine is undesirably deteriorated. Furthermore since, if the battery has been used for a long time period so that its capacity has deteriorated, there is a possibility that the frequency of such dropping of the power source voltage below the operating voltage of the calculation device when the engine is being started will be increased, and since, when the outputting of the reset signal continues, a considerable time period is taken until the starter relay is driven, accordingly a useless load comes to be imposed upon the battery, and a state may be arrived at in which the engine cannot be started. To describe this situation further, since it is decided that the power source voltage has dropped and the calculation device has run wild merely upon the reset signal being outputted from the calculation device, there is a fear that it may be decided that the power source voltage has dropped, irrespective of whether or not the calculation device is in fact running wild or not, so that and the engine may undesirably be started.

SUMMARY OF THE INVENTION

Thus, an object of the present invention is to provide a starter drive device which, without increase of the number of component parts, can accurately perform determination of dropping of the power source voltage and erroneous operation of the calculation device, and, along with maintaining stable operation of the ON state of the starter relay when the power source voltage drops, also is capable of turning it OFF when one or more conditions for commencing starting of the engine are not satisfied, thus preventing the engine from being started.

In order to solve the above described problems, the present invention proposes a starter drive device which drives a starter motor by, upon actuation of a starter switch, turning a starter relay ON and OFF via an electronic control device, wherein the electronic control device includes: an interface circuit which detects turning ON and OFF of the starter switch; a power source control circuit which monitors a power source of the electronic control device; a calculation device and a delay circuit which are connected to the power source control circuit; a buffer which has an input side and an output side, and which allows transmission of signals from the input side to the output side depending on a signal from the delay circuit; an addition circuit which-adds-together the output of the buffer and the output of the interface circuit; a latch circuit which operates a driver circuit of the starter relay, based upon the output of the addition circuit; a first pull up circuit which pulls up the output of the calculation device when the calculation device is stopped; and a second pull up circuit which pulls up the output side of the buffer; and wherein, if the power source control circuit has detected a drop of voltage of the power source when the starter motor is being driven, along with stopping the calculation device, the buffer disconnects the calculation device from the latch circuit, and controls the starter relay by operating the driver circuit via the latch circuit based upon the signals from the interface circuit and the second pull up circuit.

By employing this type of structure, it is possible to decide accurately with the power source control circuit when the power source voltage has dropped due to driving of the starter motor, and it is possible, only when it has been decided that the power source voltage has thus dropped, to continue driving the starter motor in a safe and reliable manner by stopping the calculation device.

In this starter drive device according to the present invention, the delay circuit may maintain the state in which the calculation device and the latch circuit are disconnected from one another, during the time interval from when the power source control circuit detects restoration of the power source voltage, until the initialization of the calculation device is completed.

In this case it is possible to prevent the action of the starter relay to disconnect the calculation device with the buffer from becoming unstable, during this interval while the calculation device may be in an unstable state.

Moreover, according to the present invention, the calculation device may turn the starter relay ON if a condition for commencing engine starting is satisfied.

Since, in this case, it is possible reliably to prevent the starter motor being driven if the condition (or several conditions) for commencing engine starting is not satisfied, accordingly, along with it being possible to start the vehicle while ensuring that it does not start off abruptly from rest, also it is ensured that the engine is not started if there is anything wrong with the vehicle, and it is possible, in this case, to invite the vehicle operator to perform repairs.

Since, according to the present invention as described above, it is possible to decide accurately with the power source control circuit whether or not the power source voltage has dropped due to driving of the starter motor, so that, only if it has been decided that the power source voltage has indeed dropped, it is possible to stop the calculation device safely and to continue driving the starter motor, accordingly the beneficial effect is obtained that it is possible to enhance the startability of the engine and the reliability of operation of the starter relay, without any increase in the number of components required for the system.

Moreover since, according to the present invention as described above, in addition to the above described beneficial effect, it is possible to prevent the action of the starter relay from becoming unstable by disconnecting the calculation device, when its operation has become unstable, by using the buffer, accordingly it is possible to continue driving of the starter motor even during the initialization of the calculation device which accompanies its starting up procedure, so that the beneficial effect is obtained that it becomes possible to anticipate enhancement of the startability of the engine.

Yet further since, according to the present invention as described above, in addition to the above described beneficial effect, it is possible reliably to prevent driving of the starter motor if the engine starting commencing condition (or conditions) is not satisfied, accordingly, along with it being possible to start the engine safely while ensuring that the vehicle does not abruptly start off from rest, also; since the engine will not start if there is anything wrong or abnormal with the vehicle, it is possible to invite the vehicle operator to perform maintenance or repair, and thus the beneficial effect is obtained that it is possible to alleviate the burden of responsibility upon the operator of the vehicle.

DETAILED DESCRIPTION OF THE INVENTION

In the following, the preferred embodiment of the present invention will be explained with reference to the drawings.

Figure 1:
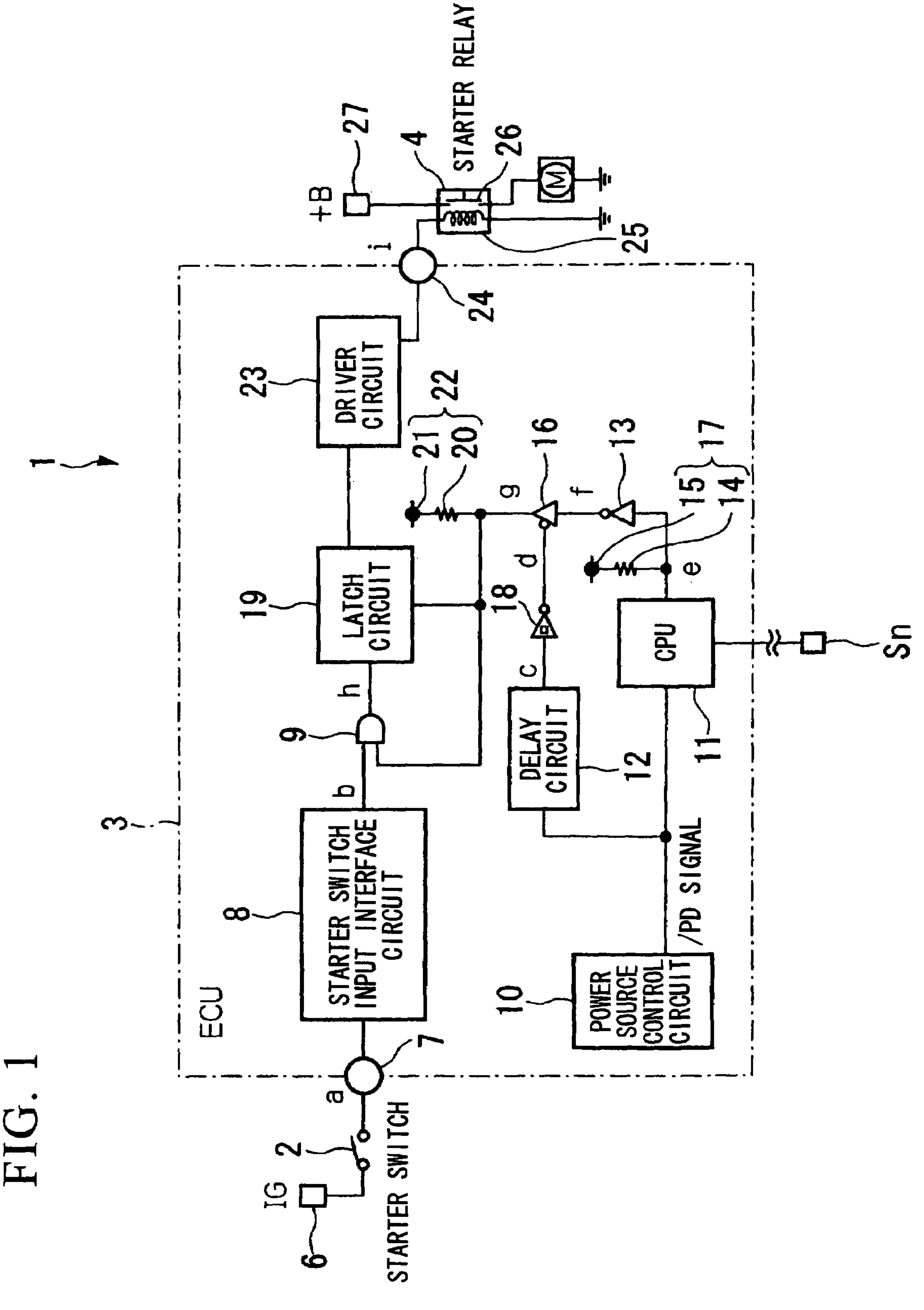
FIG. 1 is a block diagram showing the preferred embodiment of the present invention.

In FIG. 1, the reference symbol 1 denotes a starter drive device of a vehicle. This starter drive device 1 includes a starter switch 2, a control unit (ECU) 3 which is an electronic control device, and a starter relay 4. Here, the control unit 3 is a device which, upon the starter switch 2 being turned ON or OFF, controls the turning ON and the OFF of a starter motor M by controlling the turning ON and the OFF of relay contact points 5 of the starter relay 4.

One end of the starter switch 2 is connected to a power source not shown in the figure (i.e., a battery). By a key switch not shown in the figures being actuated to be ON, a voltage (IG) corresponding to the voltage of the battery is generated and is supplied to this starter switch 2. The key switch is a switch which also performs supply and cutoff of electrical power to various electrical equipment of the vehicle, not shown in the figures, other than the starter switch, and, when it is in its the actuating position, electrical power is also supplied to the control unit 3 via an input terminal thereof not shown in the figure. On the other hand, an input terminal 7 of the control unit 3 is also connected to the other end of the starter switch 2.

A starter switch input interface circuit 8 (an interface circuit) is provided within the control unit 3, and is connected to its the input terminal 7. This starter switch input interface circuit 8 is a device for inputting the signal from the starter switch 2 into the control unit 3, and its output side is connected to an adder 9 (an addition circuit). In concrete terms, when the starter switch 2 is turned ON and the voltage of the ignition 6 is inputted to the starter switch input interface circuit 8, the starter switch input interface circuit 8 outputs a Hi signal to the adder 9 which is connected to the starter switch input interface circuit 8.

Moreover, a power source control circuit 10 is provided to the control unit 3, and monitors and controls the power source voltage to the control unit 3. A calculation unit (a CPU) 11, which is a calculation device, and a delay circuit 12 are connected in parallel to this power source control circuit 10. This delay circuit 12 is a delay circuit which delays the output signal from the power source control circuit 10 for a predetermined time period. The power source control circuit 10 is a device which outputs a power down (PD) signal to the calculation unit 11 and the delay circuit 12, if the power source voltage to the control unit has dropped.

A sensor group Sn, which includes an engine rotational speed sensor, a brake sensor, a shift position sensor and so on, is connected to the calculation unit 11. The calculation unit 11 is a device which decides whether or not to permit the starter relay 4 to be turned ON based upon the result of detection by the sensor group Sn. In concrete terms, the calculation unit 11 outputs a Hi signal if certain conditions for commencing starting of the vehicle engine are satisfied, as indicated by the signals from the various sensors of the sensor group Sn, so that it is possible to start the engine safely, such as that there is no fault in the engine control system, that there is no fault in the vehicle body control system, that there is no fault in the control unit 3, that the vehicle will not abruptly move away from rest even if its engine is started, and the like; while, if these conditions for commencing starting of the engine are not satisfied, the calculation unit 11 outputs a Lo signal.

An inverter 13 is connected to the output side of the calculation unit 11. A voltage source 15 is connected, via a pull up resistor 14, between the calculation unit 11 and this inverter 13. A non-inverting three state buffer 16 (a buffer) is connected to the output side of the inverter 13. This non-inverting three state buffer 16 is a device which transmits an input signal which is inputted thereto to its output side, or performs cutoff thereof, based upon an output signal inputted from a Schmitt trigger inverter 18 which will be subsequently described to a gate of the non-inverting three state buffer 16. Thus, the pull up resistor 14 and the voltage source 15 constitute a first pull up circuit 17 (the "first pull up circuit" of the claims).

On the other hand, the Schmitt trigger inverter mentioned above is connected to the output side of the delay circuit 12. This Schmitt trigger circuit 18 is a flip-flop circuit which keeps two threshold values for the signal which is inputted thereto, an upper limit value and a lower limit value, and which changes its state when the input signal becomes higher than the upper limit value, and when its input becomes lower than the lower limit value. The gate of the non-inverting three state buffer 16 is connected to the output side of the Schmitt trigger inverter 18.

Furthermore, the input side of the previously mentioned adder 9 and a latch circuit 19 are connected to the output side of the non-inverting three state buffer 16, and a second pull up circuit (the "second pull up circuit" of the claims), which consists of a pull up resistor 20 and a voltage source 21, is connected between this adder 9 and latch circuit 19, and the non-inverting three state buffer 16.

Accordingly, both the output signals of the starter switch input interface circuit 8 and of the non-inverting three state buffer 16 come to be inputted to the input side of the adder 9.

The latch circuit 19 is connected to the output side of the adder 9. This latch circuit 19 is a device for, along with maintaining the output from the adder 9, also releasing this maintenance of the output of the adder 9 upon input of a release signal, and it is connected to a driver circuit 23 which drives the starter relay 4. A relay coil 25 of the starter relay 4 is connected to the driver circuit 23 via an output terminal 24 of the control unit 3, and a power source not shown in the figures is directly connected thereto. Thus when, based upon the output of the latch circuit 19, the driver circuit 23 drives the starter relay, an adequate electrical current is supplied to the relay coil 25.

This starter relay 4 is a so-called normally open relay, and includes the relay coil 25 and a relay contact point 26. This relay contact point 26 is interposed between a power source 27 and the vehicle starter M. Due to this, when electrical current is supplied to the relay coil 25, the relay contact point 26 closes, and electrical power from the power source 27 is supplied to the starter motor M, so that the starter motor M is driven. The power source 27 typically consists of a battery connection.

Figure 2:
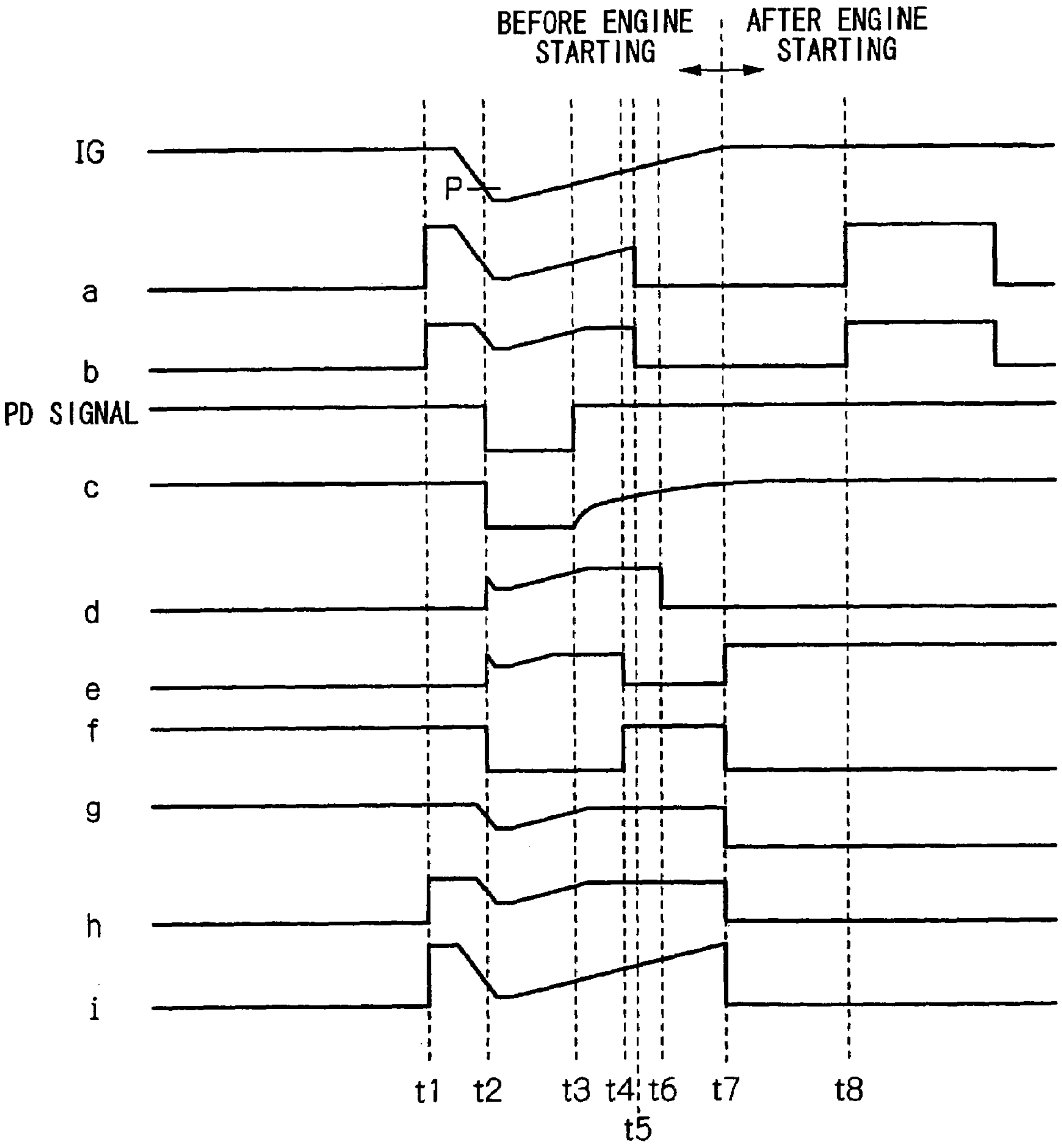
FIG. 2 is a timing chart showing the operation of this preferred embodiment.

Next, the operation of this preferred embodiment will be explained with reference to FIG. 2 and FIG. 3. Here, the signal levels "a" through "i" in FIG. 2 and FIG. 3 indicate spot signal levels at the points in the circuit of FIG. 1 above which correspond to the, marked symbols "a" through "i".

First, at the time point t1, upon the starter switch 2 being turned to ON, a signal is inputted to the input terminal of the control unit 3 (shown by "a" in FIG. 1), and the output of the starter switch input interface circuit 8 (shown by "b" in FIG. 1) goes to Hi. If, at this time, the output signal from the calculation unit 11 (shown by "e" in FIG. 1) is in its state which can turn the starter relay 4 ON (i.e., its Lo state), then the output of the driver circuit 23 is ON—that is to say, its output terminal 24 (shown by "i" in FIG. 1) is Hi, so that the starter relay 4 is turned ON. Thus, even if hereafter the starter switch 4 is turned OFF, the starter relay 4 continues to be kept in the ON state until an starter relay OFF output signal (Hi) from the calculation unit 11, i.e., a latch clear signal (Lo), is inputted to the latch circuit 19.

Next, at the time point t2, the starter motor M is driven by the starter relay 4 going to ON, so that a drop in the power source voltage (shown by the voltage "IG" in FIG. 2) takes place. When, due to this drop in the power source voltage, the power source voltage drops below a predetermined threshold value P, then this drop in the power source voltage is detected by the power source control circuit 10. Upon such detection of this drop in the power source voltage, a power down signal (shown by the signal "PD" in FIG. 1), which is outputted from the power source control circuit 10 towards the calculation unit 11 and the delay circuit 12, goes to Lo, so that the operation of the calculation unit 11 is stopped. Thus, if the power source voltage has dropped below the predetermined threshold value P, thereafter starter control is performed by the calculation unit 11.

When, at the time points t2 to t3, the calculation unit 11 comes to stop its operation, then the output from this calculation unit 11 becomes in a high impedance state (logically indeterminate), and the output side of the calculation unit 11 is pulled up by the first pull up circuit 17, so that it is kept at Hi level.

When the output side of the calculation unit 11 is brought to Hi by the first pull up circuit 17, and the output of the inverter 13 (shown by "f" in FIG. 1) becomes Lo, then the output of the non-inverting three state buffer 16 (shown by "g" in FIG. 1) becomes Lo, and a latch clear signal (Lo) is inputted to the latch circuit 19 which is holding the starter relay 4 ON, so that it becomes impossible for it to maintain the ON state of the starter relay 4. However, since the output of the Schmitt trigger inverter (shown by "d" in FIG. 1) is triggered by the power down signal from the power source control circuit 10 and becomes Hi and is inputted to the gate of the non-inverting three state buffer 16, accordingly the circuit between the output side and the input side of the non-inverting three state buffer 16 is interrupted, so that, as a result, the output side of the non-inverting three state buffer 16 is brought to Hi by the second pull up circuit 22. That is to say, it is possible to continue the ON state of the starter relay 4 with the latch circuit 19, since a latch maintenance signal (Hi) is inputted to the latch circuit 19.

At the time points t3 to t4, the battery voltage recovers, and the power down signal is restored from Lo to Hi. At this time, the calculation unit 11 shifts to its initial starting state. Even during the initial start state, i.e., so-called initialization, the output side of the calculation unit 11 is kept in the high impedance state. However, since the Lo state of the power down signal is maintained by the delay circuit 12 until the initialization is complete (at the time point t4 in FIG. 2), accordingly no latch clear signal is inputted to the latch circuit 19 previously described, so that the starter relay 4 continues to be ON. Here, it is supposed that the starter switch is turned OFF by the driver of the vehicle, for example at the time point t5.

At the time points t3 to t6, a delay in output (shown by “c” in FIG. 1) is provided by the previously described delay circuit 12. At the time point t6 the delay by the delay circuit 12 is completed, i.e., the initialization of the calculation unit 11 is completed, and the output of the Schmitt trigger inverter 18 goes from Hi to Lo.

Next, at the time point t7, the fact that the engine rotational speed has arrived at a predetermined rotational speed at which it is possible to decide that the engine has started is detected by the rotational speed sensor, and, along with turning the starter relay 4 OFF, the turning ON of the starter relay 4 is prohibited. In concrete terms this is because, since as described above the maintenance by the delay circuit 12 is terminated, the state in which the input side and the output side of the non-inverting three state buffer 16 are electrically disconnected from one another is cleared. Due to this, a signal which is equal to the signal at the input side of the non-inverting three state buffer 16 comes to be outputted from the output side of the non-inverting three state buffer 16.

When the output of the calculation unit 11 goes to Hi, the output of the inverter 13 goes to Lo, and the input side of the non-inverting three state buffer 16 goes to Lo. Since, due to this, the output of the non-inverting three state buffer 16 goes to Lo, accordingly a latch clear signal comes to be inputted to the latch circuit 19, and as a result the starter relay is turned OFF.

Furthermore, since the outputs of the starter switch input interface circuit 8 and the previously described non-inverting three state buffer 16 are inputted to the adder 9, by the output of the non-inverting three state buffer 16 going to Lo, the previously described OFF state of the starter relay 4 is maintained; in other words, the turning ON of the starter relay 4 comes to be prohibited. If, for example, the starter switch 2 is turned ON at the time point t8, then, since the output of the calculation unit 11 is Hi, the output of the non-inverting three state buffer 16 becomes Lo, so that as a result the turning ON of the starter relay is not permitted, and the output of the adder 9 is kept Lo just as it is.

Figure 3:
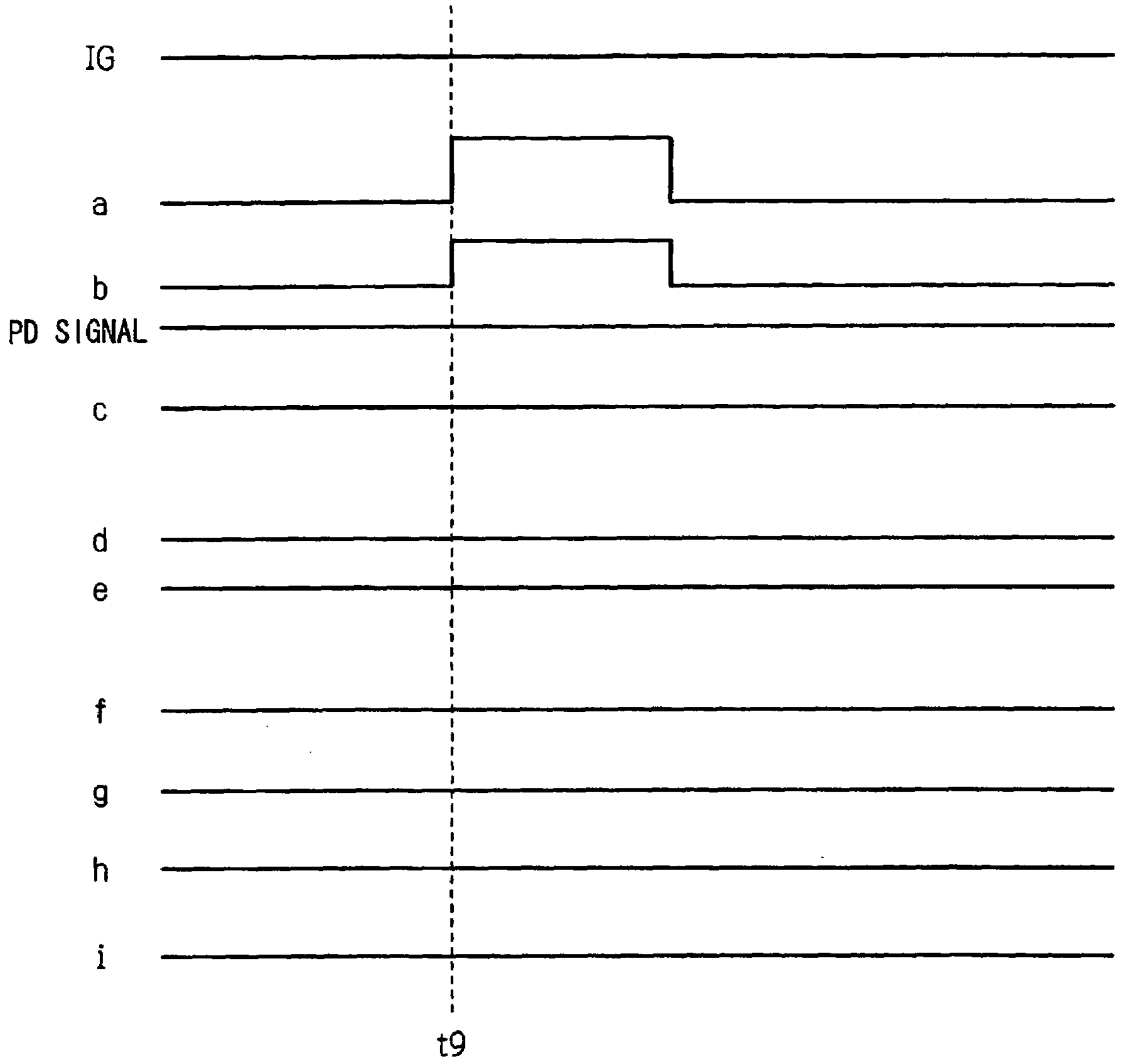
FIG. 3 is a timing chart corresponding to FIG. 2, showing the operation during a calculation unit fault.

As shown in FIG. 3, if a fault has occurred in the calculation unit 11, the output of the calculation unit 11 goes into a high impedance state, and as a result the output of the calculation unit 11 is pulled up by the first pull up circuit 17, and goes into the Hi state. The output of the non-inverting three state buffer 16 goes to Lo, so that, along with the previously described latch clear signal being inputted to the latch circuit 19, also one of the two inputs to the adder 9 becomes Lo.

On the other hand, when the starter switch 2 is turned ON at the time point t9, the output of the starter switch input interface circuit 8 becomes Hi, so that the other input side of the adder 9 becomes Hi. That is to say, since the output of the adder 9 becomes Lo irrespective of whether the starter switch 2 is ON or OFF, accordingly no signal is outputted from the latch circuit 19 towards the driver circuit 23 for operating the starter relay 4.

Thus, according to the above described preferred embodiment of the present invention, when due to the starter switch 2 being turned ON the starter motor M is driven and the power source voltage of the power source control circuit 10 drops, along with safely stopping the operation of the calculation unit 11, the input and the output of the non-inverting three state buffer 16 are disconnected, so that the output side of the non-inverting three state buffer 16 is pulled up by the second pull up circuit 22. Due to this, when the output of the adder 9 is maintained in the Hi state and the latched state of the latch circuit 19 is continued, then the driver circuit 23 maintains the ON state of the starter relay 4 and it becomes possible to continue the driving of the starter motor M. As a result, it is possible to enhance the startability of the engine and the reliability of operation of the starter relay 4 during engine starting, without increasing the number of component parts in the system.

Furthermore, it becomes possible to anticipate yet further enhancement of the reliability, since it is possible to continue the driving of the starter motor M even during the initialization-which accompanies the starting of the calculation unit 11.

Still further since, along with being able to perform starting safely by preventing the driving of the starter motor M by the calculation unit 11 when the engine starting commencement conditions are not satisfied, so that the vehicle does not start off from rest abruptly, and also so that the engine is not started if anything is wrong with the vehicle, accordingly it is possible to call upon the driver of the vehicle to perform repairs. Furthermore, if the calculation unit 11 is faulty and its output goes to the high impedance state, it is possible to prevent driving of the starter motor M by fixing the output of the calculation unit 11 to the Hi state by the first pull up circuit 17.

The present invention is not to be considered as being limited to the various embodiments described above; it could also be applied to the starting of any engine with a starter motor in the same manner as an automobile or a motorcycle or the like, and it could also be applied to starting the engine of a ship or the like. Thus, while preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A starter drive device which drives a starter motor by, upon actuation of a starter switch, turning a starter relay ON and OFF via an electronic control device, wherein the electronic control device comprises:

an interface circuit which detects turning ON and OFF of the starter switch;

a power source control circuit which monitors a power source of the electronic control device;

a calculation device and a delay circuit which are connected to the power source control circuit;

a buffer which has an input side and an output side, and which allows transmission of signals from the input side to the output side depending on a signal from the delay circuit;

an addition circuit which adds together the output of the buffer and the output of the interface circuit;

a latch circuit which operates a driver circuit of the starter relay, based upon the output of the addition circuit;

a first pull up circuit which pulls up the output of the calculation device when the calculation device is stopped; and a second pull up circuit which pulls up the output side of the buffer, wherein, if the power source control circuit has detected a drop of voltage of the power source when the starter motor is being driven, along with stopping the calculation device, the buffer disconnects the calculation device from the latch circuit, and controls the starter relay by operating the driver circuit via the latch circuit based upon the signals from the interface circuit and the second pull up, circuit.

2. A starter device as claimed in claim 1, wherein the delay circuit maintains the state in which the calculation device and the latch circuit are disconnected from one another, during the time interval from when the power source control circuit detects restoration of the power source voltage, until the initialization of the calculation device is completed.

3. A starter device as claimed in claim 1, wherein the calculation device turns the starter relay ON if a condition for commencing engine starting is satisfied.

* * * * *